July 18, 1950     W. K. SONNEMANN     2,516,022
RELAYING SYSTEM

Filed Aug. 18, 1945

WITNESSES:

INVENTOR
William K. Sonnemann
BY
O. B. Buchanan
ATTORNEY

Patented July 18, 1950

2,516,022

UNITED STATES PATENT OFFICE 2,516,022

RELAYING SYSTEM

William K. Sonnemann, Roselle Park, N. J., assignor to Westinghouse Electric Corporation, East Pittsburgh, Pa., a corporation of Pennsylvania Application August 18, 1945, Serial No. 611,399

7 Claims. (Cl. 175—294)

My invention relates to special phase-sequence relaying systems for protecting a 3-phase transmission line against faults, and my invention has special reference to a negative-plus-zero sequence filter-network having distorted current-inputs. The network itself may, or may not, be distorted.

In my application Serial No. 591,079, filed April 30, 1945, I described and claimed a negative-sequence filter, or a negative-plus-zero sequence filter, which was distorted, or out of adjustment, with the result that it responded slightly to the positive-sequence current-component, but not as sensitively or strongly as the negative-sequence response. When such a system is utilized to energize protective relays for protecting a 3-phase line against faults, the small positive-sequence response made it possible to utilize the negative-sequence response in order to obtain a desired sensitivity to phase-to-phase fault-conditions, without losing all sensitivity to 3-phase faults, which have no negative-sequence component.

It is an object of my present invention to accomplish somewhat similar results in a different way. More specifically, it is an object of my invention to provide a sequence-filter system in which means are provided for introducing a predetermined artificial distortion in the currents which are delivered to the filter.

With the foregoing and other objects in view, my invention consists in the systems, combinations, apparatus, parts and methods hereinafter described and claimed, and illustrated in the accompanying drawing, wherein the three figures are diagrammatic views of circuits and apparatus, illustrating my invention in three different illustrative forms of embodiment.

Figure 1:
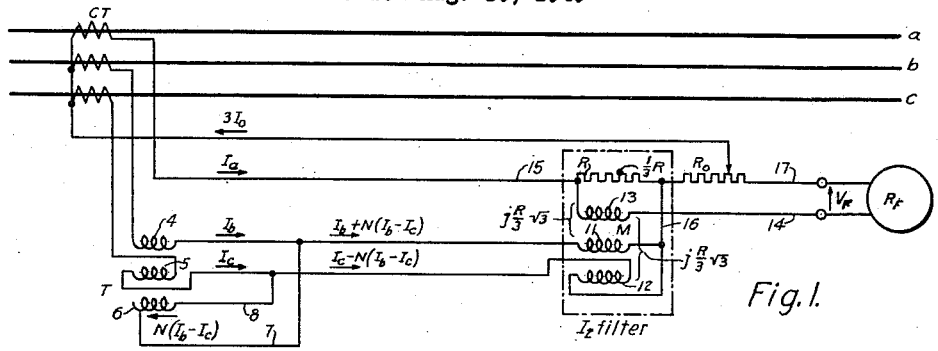

In Figure 1, I have shown one of the preferred forms of embodiment of my invention, in which the line-currents $I_a$, $I_b$, $I_c$ of a 3-phase transmission line $a$, $b$, $c$ are at all times derived by means of star-connected current-transformers CT, which also have a return-current connection for the neutral current $3I_0$, as shown. These line-currents $I_a$, $I_b$ and $I_c$ are supplied to a sequence-network which will be subsequently described, but before being supplied to the network, these line-currents are at all times artificially distorted in any way. There are many different ways of distorting these line-currents, and the particular distorting-means which I have shown in Fig. 1 are intended to be broadly representative or symbolic of any current-distorting means.

In Fig. 1, the current-distorting means are in the form of auxiliary current-transformers T, having two primary windings 4 and 5, which are traversed by $I_b$ and $-I_c$, respectively, and an adjustable-turn-number secondary winding 6 which produces a current $N(I_b-I_c)$ in the transformer secondary terminals 7 and 8. This secondary output can be applied to any portion of the input-circuit into the filter, or into any portion of the filter itself. In Fig. 1, the output of the distorting transformer T is applied to the phase-B and phase-C input-circuits of the network, so that the network is supplied with the currents $I_a$, $I_b+N(I_b-I_c)$, and $I_c-N(I_b-I_c)$, instead of being supplied with the undistorted currents $I_a$, $I_b$ and $I_c$.

The phase-sequence filter-network which receives these distorted currents may be any kind of phase-sequence current-filter, either positive or negative sequence, or positive-plus-zero or negative-plus-zero sequence, either distorted or undistorted. For protective relaying purposes, it is generally preferable to utilize an undistorted negative-plus-zero sequence-filter, similar to the positive-plus-zero sequence-filter which has been so successfully utilized in pilot-line and carrier-current relays known as the Type HCB and Type HKB systems, respectively, and described in the Harder Patent 2,183,646, the only difference being that two of the filter input-leads are reversed, so that the filter becomes a negative-plus-zero sequence-filter instead of a positive-plus-zero sequence-filter. In this filter, the sensitivity of the zero-sequence response can be adjusted or "weighted" by adjustments in the filter-setting, or the filter can be adjusted to respond to pure positive-sequence currents, or negative-sequence-currents, depending upon the phase-rotation, without any response to the other two components of the input-currents. By an "undistorted" negative-sequence filter-network, or negative-plus-zero sequence filter-network, I mean a network which does not develop any output-voltage in response to the positive-sequence component which is present in the currents which are fed into the network.

While I am not limited, therefore, to any particular kind of sequence-network in Fig. 1, I have illustrated a preferred kind of network, which consists of an undistorted negative-sequence filter, which is marked with the legend "$I_2$ filter," and which consists of a resistor R which is traversed by the input-current $I_a$, and a 3-winding mutual reactance M, having two primary windings 11 and 12, which are respectively traversed by the input-currents $I_b+N(I_b-I_c)$, and $-I_c+N(I_b-I_c)$. The mutual reactance M also has a secondary winding 13 having a reactance $jR/\sqrt{3}$ with respect to either primary winding. One terminal of the mutual-reactance secondary 13 is connected to the network-terminal 14, while the other secondary terminal is connected to the input-terminal 15 of the phase-A resistor R. The two primary windings 11 and 12 of the mutual reactance M are connected to a star-point 16 which is connected to the other terminal of the phase-A resistor R.

In addition to the negative-sequence filter $I_2$, which has just been described, I prefer to provide an adjustable resistor $R_0$, which is connected between the star-point 16 and the second terminal 17 of the filter-network, the resistor $R_0$ being tapped at adjustable points to provide a return-circuit for the neutral current $3I_0$. The adjustable resistor $R_0$ provides an adjustably weighted zero-sequence response, as explained in the Harder patent. At the same time, the network is arranged so that the adjustable tap on the $R_0$ resistor can be moved over to the $R/3$ point on the phase-A resistor, so as to provide a pure negative-sequence response, without any zero-sequence response, as described in the Harder patent.

The output of the filter-network, produced in the network-terminals 14, 17, is a single-phase filter-voltage $V_F$, which may be applied to any relay or relays, symbolically indicated at $R_F$.

In Fig. 1, the effect of my distorting means T, for introducing a predetermined distortion in the currents which are fed into the negative-sequence filter $I_2$, is to artificially manufacture a negative-sequence current-component, so that the negative-sequence filter $I_2$ will respond, even though the line-currents $I_a$, $I_b$, $I_c$ are balanced positive-sequence currents, without any negative-sequence component. This is true, because the output-terminals 7 and 8 of the distorting transformer T introduce a single-phase current-component $N(I_b-I_c)$, which is equivalent to introducing two equal rotational-sequence components having 57.7% of the magnitude of the single-phase current which is introduced. By rotational-sequence components, I mean the positive and the negative phase-sequence components, each of which consists of currents, in each phase, having a symmetrical or 120° phase-relation with each other, with the phases rotating in the positive and negative directions, respectively. By thus manufacturing a negative-sequence component, even when no negative-sequence component is present in the actual line-currents, I obtain a relay-network which has a certain responsiveness or sensitivity to 3-phase faults on the line.

As previously noted, any distorting-means might be utilized, for introducing any distorting currents into any of the filter-impedances R, M or $R_0$.

Figure 2:
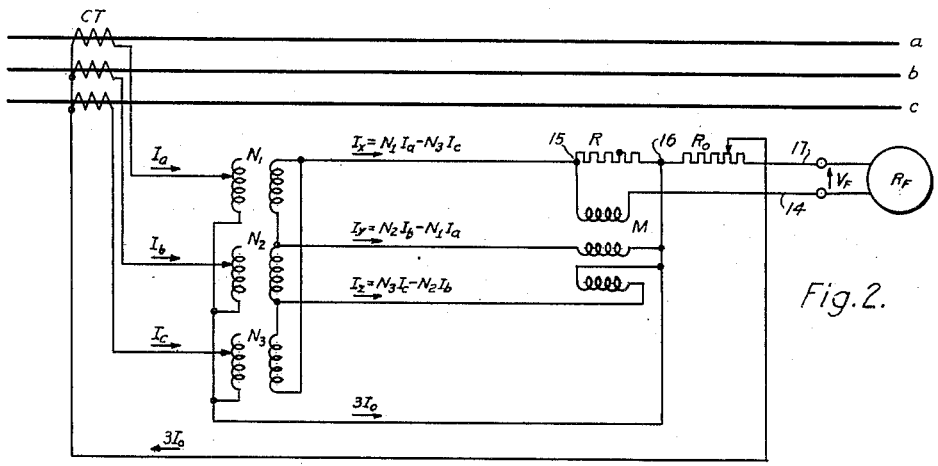

In Fig. 2, I have shown an alternative means for distorting the input-currents to the filter, utilizing three auxiliary current-transformers $N_1$, $N_2$ and $N_3$, having separately adjustable ratios which are indicated by the same symbols $N_1$, $N_2$ and $N_3$. The primary windings of these three auxiliary current-transformers $N_1$, $N_2$ and $N_3$ are connected in star, and are energized by the respective line-currents $I_a$, $I_b$ and $I_c$, the star-point being connected to the filter-star-point 16, so as to deliver the neutral current $3I_0$ to the auxiliary filter-resistance $R_0$. The secondary windings of these three auxiliary current-transformers are connected in delta, in Fig. 2, so as to deliver the three distorted delta-currents $I_X$, $I_Y$ and $I_Z$ to the filter-network terminals, where $$I_X = N_1 I_a - N_3 I_c$$
$$I_Y = N_2 I_b - N_1 I_a$$
$$I_Z = N_3 I_c - N_2 I_b$$

If the transformation-ratios $N_1$, $N_2$ and $N_3$ are not all identical, in Fig. 2, an artificial or manufactured current-distortion is thus introduced, providing an artificial negative-sequence current-component even though the line-currents are balanced positive-sequence currents, as in the case of a 3-phase fault.

Figure 3:
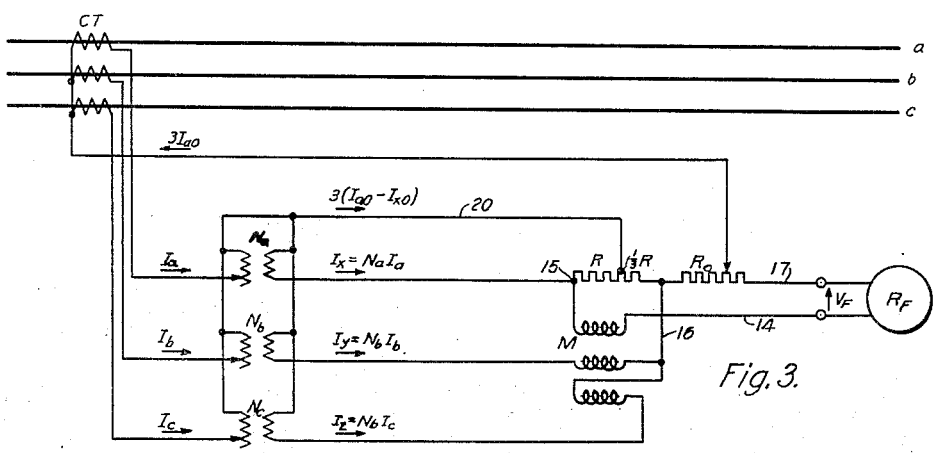

In Fig. 3, the distorting means is in the form of three adjustable-ratio star-star-connected auxiliary current-transformers $N_a$, $N_b$ and $N_c$, in which the primary windings are star-connected, and are traversed by the line-currents $I_a$, $I_b$ and $I_c$, respectively. The secondary windings of the auxiliary current-transformers $N_a$, $N_b$ and $N_c$ are also star-connected, and they are utilized to supply the auxiliary star-phase currents $I_x$, $I_y$ and $I_z$ to the phase-terminals of the filter-network, where $$I_x = N_a I_a$$
$$I_y = N_b I_b$$
$$I_z = N_c I_c$$

In Fig. 3, the two star-points, of the primary and secondary windings of the auxiliary current-transformers $N_a$, $N_b$ and $N_c$, are connected to a common conductor 20, which is connected to the $R/3$ point of the filter-resistor R, so as to supply the zero-sequence line-current component $I_{a0}$, (previously called $I_0$), to the filter-impedance $(R/3+R_0)$, and so as to provide a return-path for the zero-sequence component, $I_{x0}$, of the secondary currents $I_x$, $I_y$, $I_z$.

These three figures of the drawing are only examples of countless variations of the distorting-means which might be utilized for artificially distorting the input-currents of the filter-network. An illustrative example of the manner in which the distorting influence can be mathematically calculated will now be given, for the system shown in Fig. 1, with the understanding that similar calculations can be made for the systems shown in Figs. 2 and 3, or for any other distorted-current system which might be devised.

In Fig. 1, the filter-voltage is $$V_F = [2RI_{a2} + (R+3R_0)I_0] - j\frac{2NR}{\sqrt{3}}(I_b - I_c) \quad (1)$$

Substituting the sequence-component expressions for $I_b$ and $I_c$, $$V_F = 2RI_{a2} + (R+3R_0)I_0 - j\frac{2NR}{\sqrt{3}}\alpha^2 I_{a1} + \alpha I_{a2} +$$
$$I_{a0} - \alpha I_{a1} - \alpha^2 I_{a2} - I_{a0}) \quad (2)$$

Substituting $$(\alpha^2 - \alpha) = -j\sqrt{3}, \text{ and } (\alpha - \alpha^2) = +j\sqrt{3}$$

$$V_F = -2NRI_{a1} + 2R(1+N)I_{a2} + (R+3R_0)I_{a0} \quad (3)$$

This equation shows that the filter-response, $V_F$, is responsive to each of the three phase-sequence components, $I_{a1}$, $I_{a2}$, and $I_{a0}$, of the line-currents $I_a$, $I_b$, $I_c$, but by a different and readily controllable response-ratio to each phase-sequence component.

For a 3-phase fault, $I_{a2} = I_{a0} = 0$; and making this substitution in Equation 3, we find that the fault-current necessary to obtain a predetermined filter-response $V_F$ is $$\bar{I}_F = \bar{I}_a = \bar{I}_b = \bar{I}_c = \bar{I}_{a1} = \frac{V_F}{2NR} \quad (4)$$

For a phase-BC fault, $I_{a2}=-I_{a1}$, and $I_{a0}=0$; and making these substitutions in Equation 3, we find that the fault-current necessary to obtain a predetermined filter-response $V_F$ is $$\bar{I}_F=\bar{I}_b=\bar{I}_{a1}\sqrt{3}=\frac{V_F\sqrt{3}}{2R(1+2N)} \quad (5)$$

For a phase-BC fault, $I_{a2}=I_{a1}\angle -60°$, and $I_{a0}=0$; and making these substitutions in Equation 3, we find that the fault-current necessary to obtain a predetermined filter response $V_F$ is $$\bar{I}_F=\bar{I}_a=\bar{I}_{a1}\sqrt{3}=\frac{V_F\sqrt{3}}{2NR\angle 180°+2R(1+N)\angle -60°}$$

$$=\frac{V_F\sqrt{3}}{2R(1+N+N\angle -120°)}$$

$$=\frac{V_F\sqrt{3}}{2R\sqrt{(1+N+N\cos 120°)^2+N^2\sin^2 120°}}$$

$$=\frac{V_F\sqrt{3}}{2R\sqrt{(1+0.5N)^2+0.75N^2}}$$

$$=\frac{V_F\sqrt{3}}{2R\sqrt{1+N+N^2}} \quad (6)$$

For a phase-AB fault, $I_{a2}=I_{a1}\angle 60°$, and $I_{a0}=0$; and making these substitutions in Equation 3, we find that the fault-current necessary to obtain a predetermined filter-response $V_F$ is $$\bar{I}_F=\bar{I}_a=\bar{I}_{a1}\sqrt{3}=$$

$$\frac{V_F\sqrt{3}}{-2NR+2R(1+N)\angle 60°}=\frac{V_F\sqrt{3}}{2R\sqrt{1+N+N^2}} \quad (7)$$

For a phase-AG fault, $I_{a1}=I_{a2}=I_{a0}$; and Equation 3 yields $$\bar{I}_F=\bar{I}_a=3\bar{I}_{a1}=\frac{V_F}{R_0+R} \quad (8)$$

For a phase-BG fault, $I_{a2}=I_{a1}\angle 120°$, and $I_{a0}=I_{a1}\angle -120°$;

and Equation 3 yields $$\bar{I}_F=\bar{I}_b=3\bar{I}_{a1}=\frac{3V_F}{-2NR+2R(1+N)\angle 120°+(R+3R_0)\angle -120°}$$

$$=\frac{3V_F}{-2NR\angle 120°+2R(1+N)\angle -120°+R+3R_0}$$

$$=\frac{3V_F}{\sqrt{9R_0^2+3R^2(1+2N)^2}} \quad (9)$$

For a phase-CG fault, $I_{a2}=I_{a1}\angle -120°$, and $I_{a0}=I_{a1}\angle 120°$; and Equation 3 yields $$\bar{I}_F=\bar{I}_c=3\bar{I}_{a1}=\frac{3V_F}{-2NR+2R(1+N)\angle -120°+(R+3R_0)\angle 120°}$$

$$=\frac{3V_F}{\sqrt{9R_0^2+3R^2(1+2N)^2}} \quad (10)$$

It will be understood that any values of $V_F$, $R$, $R_0$ and $N$ may be substituted in Equations 4 to 10, the value $V_F$ representing the balance-point setting of the relay $R_F$ which is energized from the filter-voltage $V_F$. For example, $R_0$ may be equal to either $16R$ or $5.1R$, which are two of the settings commercially used in the positive-plus-zero sequence-relay of the Harder Patent 2,183,646.

In Table 1, the operation of my new distorted negative-plus-zero sequence-relay is illustrated by tabulating the fault-current $\bar{I}_F$ from each of Equations 4 to 10 for either one of two illustrative network-adjustments, such as, $R_0=16R$ and $N=+0.5$, for the first adjustment, and $R_0=5.1R$ and $N=-0.2$, for the other adjustment, the negative sign meaning a reversal of the terminals of the transformer T which supplies the distorting component. In the table, I have also indicated the relative sensitivity $\bar{S}$ of the network-response to the various types of fault, taking the three-phase fault as the basis of comparison, according to the formulas, $$\bar{S}_{BC}=\frac{(1+2N)\sqrt{3}}{3N} \quad (11)$$

$$\bar{S}_{AC}=\bar{S}_{AB}=\frac{1}{3N}\sqrt{3+3N3N^2} \quad (12)$$

$$\bar{S}_{AG}=\frac{1+R_0/R}{2N} \quad (13)$$

$$\bar{S}_{BG}=\bar{S}_{CG}=\frac{1}{6N}\sqrt{9R_0^2/R^2+3(1+2N^2)} \quad (14)$$

Table

| Fault | $R_0=16R$, $N=+0.5$ | | $R_0=5.1R$, $N=-0.2$ | |
|---|---|---|---|---|
| | $\bar{I}_F$ | $\bar{S}$ | $\bar{I}_F$ | $\bar{S}$ |
| I | II | III | IV | V |
| A—B—C | 1.000 $V_F/R$ | 1.0 | 2.500 $V_F/R$ | 1.0 |
| AB | 0.655 $V_F/R$ | 1.5 | 0.945 $V_F/R$ | 2.6 |
| BC | 0.433 $V_F/R$ | 2.3 | 1.440 $V_F/R$ | 1.7 |
| CA | 0.655 $V_F/R$ | 1.5 | 0.949 $V_F/R$ | 2.6 |
| A—G | 0.059 $V_F/R$ | 17.0 | 0.164 $V_F/R$ | 15.25 |
| B—G | 0.062 $V_F/R$ | 16.0 | 0.196 $V_F/R$ | 12.8 |
| C—G | 0.062 $V_F/R$ | 16.0 | 0.196 $V_F/R$ | 12.8 |

For example if the relay $R_F$ is set to respond when the filter-voltage $V_F=0.8$ volt, and if the filter-resistance $R=0.1$ ohm, the auxiliary filter-resistance $R_0=1.6$ ohms, and the distorting-transformer ratio $N=+0.5$, the relay will be sensitive to a 3-phase fault-current of 8 amperes, a phase-to-phase fault-current of either 3.46 or 5.24 amperes, depending upon which phases are faulted, and a phase-to-phase-ground-fault current of either 0.47 ampere or 0.50 ampere, depending upon which phase is grounded. The sensitivity to two-phase-to-ground faults has not been indicated, because this depends upon the particular transmission-line constants, but, in general, this sensitivity will be between that for phase-to-phase faults and phase-to-ground faults, depending upon the relative magnitude of the zero-sequence component, compared with the other two components.

While I have specifically illustrated my invention in a relaying system utilizing a negative-sequence filter, or a negative-plus-zero phase-sequence filter, a simple reversal of two of the terminals will convert the filter to a positive-sequence filter, or a positive-plus-zero phase-sequence filter, the tapped-point at $R/3$ being utilized for the pure rotational-sequence response, either positive or negative sequence, while the tapped-points on the auxiliary resistor $R_0$ are utilized when a suitably weighted zero-sequence response is to be added. My invention is applicable in any of these cases.

Although I have specifically illustrated my invention as utilizing a phase-sequence current-filter, responding to the 3-phase line-currents, the invention is also applicable to voltage-filters which are responsive to the 3-phase line-voltages, either star or delta. In general, therefore, my invention is applicable to a distorted-input phase-sequence means for responding to a set of any 3-phase electrical quantities of the line, whether voltages, currents, or any other electrical quantities.

Furthermore, while I have given a specific example of a filter in which the rotational-sequence part of it is responsive to only one of the rotational phase-sequence components, either positive or negative, with substantially no response to the other rotational-sequence component, I wish it to be understood that this portion of the network might itself be distorted, as set forth in my copending application Serial No. 591,079, in addition to utilizing the distorting-means for the input-currents of the network. If the network were distorted, the mutual-reactance impedance would have some value other than $jR/\sqrt{3}$.

Furthermore, while I have illustrated a specific form of current-filter, utilizing a pure resistance R and a mutual reactance M, it is obviously possible to utilize, in general, a sequence-network having a plurality of impedances having a plurality of different impedance-angles and magnitudes, and circuit-means for vectorially adding a plurality of impedance-drops of said filter, to produce the filter output-voltage $V_F$.

With the foregoing and other considerations in mind I desire, therefore, that the appended claims shall be accorded the broadest construction consistent with their language.

I claim as my invention:

1. In combination, a three-phase sequence-filter adapted to receive a set of three-phase electrical quantities and to develop therefrom at least one single-phase filter-voltage having a predeterminedly selective phase-sequence relation to the received quantities, means for at all times deriving a set of three-phase electrical quantities from a three-phase line, means for at all times deriving a distorting-component of said derived set of three-phase electrical quantities, and electric-circuit means for utilizing both said derived set of three-phase electric quantities and said derived distorting-component in energizing said sequence filter.

2. Sequence-means for predeterminedly responding to a three-phase electrical quantity of a three-phase line, comprising means for at all times deriving a predeterminedly artificially distorted three-phase electrical quantity from said line-quantity, and a phase-sequence filter energized from said distorted derived quantity, said filter producing an output-voltage having a predeterminedly selective phase-sequence relation to the impressed quantity.

3. A relaying system for selectively responding to a three-phase electrical quantity of a three-phase line, comprising a filter adapted to receive a set of three-phase electrical quantities and to derive therefrom a quantity having substantially no response to one of the rotating sequence components of the impressed quantities, means for at all times deriving a predeterminedly artificially distorted three-phase electrical quantity from the aforesaid electrical quantity of the line, circuit-means for applying said derived distorted quantity to said filter, and relaying-circuit means energized from said filter.

4. A relaying system for selectively responding to a three-phase electrical quantity of a three-phase line, comprising a filter having a plurality of impedances having a plurality of different impedance-angles and magnitudes, means for at all times deriving a set of three-phase electrical quantities from a three-phase line, means for at all times deriving a distorting-component of said derived set of three-phase electrical quantities, means for applying said derived quantities and said derived component to a plurality of impedances of said filter, and output circuit-means serially including, in effect a plurality of impedances of said filter.

5. A protective relaying-system for responding to predetermined conditions on a three-phase line, comprising means for at all times deriving the three-phase line-currents for relaying purposes, means for at all times predeterminedly distorting said relaying currents, filter-means for receiving said distorted three-phase currents and for responding to the same in such manner as to have substantially no response to a selected rotational phase-sequence of the received currents, and a protective relay-means receiving energization from the output of said filter-means.

6. A protective relaying-system for responding to predetermined conditions on a three-phase line, comprising a negative-plus-zero-phase-sequence filter of a type adapted to receive a three-phase current and to derive a single-phase voltage which is responsive to the negative-sequence component of the impressed three-phase current, plus a predeterminedly weighted response to the zero-sequence component thereof, with substantially no response to the positive-sequence component thereof, means for at all times deriving the three-phase line-currents for relaying purposes, means for at all times deriving a distorting-component of said derived relaying currents, electric-circuit means for utilizing both said derived relaying currents and said derived distorting-component in energizing said filter, and a protective relay-means receiving energization from the output of said filter-means.

7. A protective relaying-system for responding to predetermined conditions on a three-phase line, comprising a filter having a plurality of impedances having a plurality of different impedance-angles and magnitudes, means for at all times deriving the three-phase line-currents for relaying purposes, means for at all times deriving a distorting-component of said derived relaying currents, circuit-means for applying said three-phase relaying currents to different impedances of said filter, said filter having circuit-means serially including, in effect, a plurality of impedances of the filter to produce the filter-output-voltage, the filter-impedances to which said three-phase relaying currents are applied being such as to substantially eliminate any output-response to the positive-sequence component of said three-phase relaying currents, circuit-means for additionally impressing said distorting-component on less than all of the impedances of the filter, and a protective relay-means receiving energization from the output of said filter-means.

WILLIAM K. SONNEMANN.

REFERENCES CITED

The following references are of record in the file of this patent:

UNITED STATES PATENTS

| Number | Name | Date |
|---|---|---|
| 1,806,392 | Genkin | May 19, 1931 |
| 1,865,430 | Borkent | July 5, 1932 |
| 2,183,646 | Harder | Dec. 19, 1939 |
| 2,283,711 | Welch | May 19, 1942 |
| 2,315,470 | Warrington | Mar. 30, 1943 |
| 2,456,976 | McConnell | Dec. 21, 1948 |